United States Patent
Foo et al.

(10) Patent No.: US 8,843,275 B2
(45) Date of Patent: Sep. 23, 2014

(54) METHOD AND APPARATUS FOR DETERMINING A VEHICLE PITCH-OVER CONDITION

(75) Inventors: Chek-Peng Foo, Ann Arbor, MI (US); Huahn-Fern Yeh, Novi, MI (US); Javier Backmann, Baden-Wurttenberg (DE); Timur Uenlu, Baden-Wurttenberg (DE); Harald Pfriender, Constance (DE)

(73) Assignee: TRW Automotive U.S. LLC, Livonia, MI (US)

( * ) Notice: Subject to any disclaimer, the term of this patent is extended or adjusted under 35 U.S.C. 154(b) by 810 days.

(21) Appl. No.: 12/995,596

(22) PCT Filed: Jun. 17, 2009

(86) PCT No.: PCT/US2009/047605
§ 371 (c)(1),
(2), (4) Date: Dec. 1, 2010

(87) PCT Pub. No.: WO2009/155315
PCT Pub. Date: Dec. 23, 2009

(65) Prior Publication Data
US 2011/0082626 A1    Apr. 7, 2011

Related U.S. Application Data

(60) Provisional application No. 61/073,518, filed on Jun. 18, 2008.

(51) Int. Cl.
*B60G 23/00* (2006.01)
*G06F 7/00* (2006.01)
(Continued)

(52) U.S. Cl.
CPC ................... *G01M 17/007* (2013.01)
USPC ................... 701/38; 701/45; 701/46; 701/47; 701/48; 701/124

(58) Field of Classification Search
CPC .......... G01M 17/007; B60G 2400/104; B60G 2400/106; B60G 2600/08; B60G 2400/0522; B60G 17/018; B60G 17/0185; B60G 17/019; B60G 17/0195; B60G 2400/0521; B60G 2800/70; B60G 2400/0523; B60G 2400/102; B60R 21/01; B60R 21/013; B60R 21/0132; B60R 22/343; B60R 2021/01327; B60R 2021/01075; B60R 2021/01306; B60R 2021/01313; B60R 2021/01325; B60R 22/46
See application file for complete search history.

(56) References Cited

U.S. PATENT DOCUMENTS 5,610,575 A    3/1997  Gioutsos
5,890,084 A    3/1999  Halasz et al.
(Continued)

FOREIGN PATENT DOCUMENTS

CN            1137779 A       12/1996
WO    WO-2007/133666 A2      11/2007

OTHER PUBLICATIONS

AccVelPos_Integration.pdf (Acceleration, velocity, and Position, Mar. 6, 2007, http://www.ugrad.math.ubc.ca/coursedoc/math101/notes/applications/velocity.html, pp. 1-3).*

(Continued)

*Primary Examiner* — Khoi Tran
*Assistant Examiner* — Bao Long T Nguyen
(74) *Attorney, Agent, or Firm* — Tarolli, Sundheim, Covell & Tummino LLP

(57) ABSTRACT

An apparatus for determining a pitch-over condition of a vehicle comprises a first accelerometer for sensing acceleration in a Z-axis direction substantially perpendicular to both a front-to-rear axis of the vehicle and a side-to-side axis of the vehicle and for providing a first acceleration signal indicative thereof. A second accelerometer for senses acceleration in an X-axis direction substantially parallel to said front-to-rear axis of the vehicle and provides a second acceleration signal indicative thereof. A controller determines a Z-axis velocity value from the first acceleration signal and a pitch-over condition of the vehicle in response to both the determined Z-axis velocity value and the second acceleration signal.

24 Claims, 3 Drawing Sheets

(51) Int. Cl.
    *G06F 17/00* (2006.01)
    *G06F 19/00* (2011.01)
    *B60R 22/00* (2006.01)
    *G06F 17/10* (2006.01)
    *G01M 17/007* (2006.01)

(56) References Cited

U.S. PATENT DOCUMENTS

| | | | |
|---|---|---|---|
| 6,002,974 A * | 12/1999 | Schiffmann | 701/36 |
| 6,192,305 B1 | 2/2001 | Schiffmann | |
| 6,249,730 B1 | 6/2001 | Khairallah et al. | |
| 6,542,073 B2 * | 4/2003 | Yeh et al. | 340/440 |
| 6,542,792 B2 * | 4/2003 | Schubert et al. | 701/1 |
| 6,600,414 B2 | 7/2003 | Foo et al. | |
| 6,600,985 B2 | 7/2003 | Weaver et al. | |
| 6,618,655 B2 | 9/2003 | Tobaru et al. | |
| 7,023,330 B2 | 4/2006 | Kamen et al. | |
| 7,401,870 B2 * | 7/2008 | Tseng et al. | 303/146 |
| 2002/0075143 A1 | 6/2002 | Foo et al. | |
| 2002/0087235 A1 | 7/2002 | Aga et al. | |
| 2002/0095244 A1 | 7/2002 | Rhode et al. | |
| 2002/0135168 A1 | 9/2002 | Mattes et al. | |
| 2002/0165654 A1 | 11/2002 | Weaver et al. | |
| 2003/0023359 A1 | 1/2003 | Kueblbeck et al. | |
| 2003/0093201 A1 * | 5/2003 | Schubert et al. | 701/46 |
| 2003/0158633 A1 | 8/2003 | Schubert | |
| 2003/0182041 A1 * | 9/2003 | Watson | 701/45 |
| 2003/0212482 A1 | 11/2003 | Lu et al. | |
| 2003/0236604 A1 | 12/2003 | Lu et al. | |
| 2004/0030481 A1 | 2/2004 | Salib et al. | |
| 2004/0064246 A1 | 4/2004 | Lu et al. | |
| 2004/0167696 A1 | 8/2004 | Ogata et al. | |
| 2005/0080543 A1 * | 4/2005 | Lu et al. | 701/70 |
| 2005/0102083 A1 | 5/2005 | Xu et al. | |
| 2005/0149240 A1 | 7/2005 | Tseng et al. | |
| 2005/0177296 A1 | 8/2005 | Brown et al. | |
| 2005/0187698 A1 | 8/2005 | Arai | |
| 2006/0089771 A1 | 4/2006 | Messih et al. | |
| 2006/0184299 A1 | 8/2006 | Wu et al. | |
| 2006/0235575 A1 | 10/2006 | Brown et al. | |
| 2007/0005212 A1 | 1/2007 | Xu et al. | |
| 2007/0067085 A1 * | 3/2007 | Lu et al. | 701/70 |

OTHER PUBLICATIONS

Accelerometers.pdf (Prof. R.G. Longoria, Note on Accelerometers, Spring 2000, The University of Texas at Austin, pp. 1-4).*
A Chinese Office Action dated Mar. 1, 2012, which we received for the corresponding Chinese Application No. 200980122665.7, filed Jun. 17, 2009 (7 pgs.).

* cited by examiner

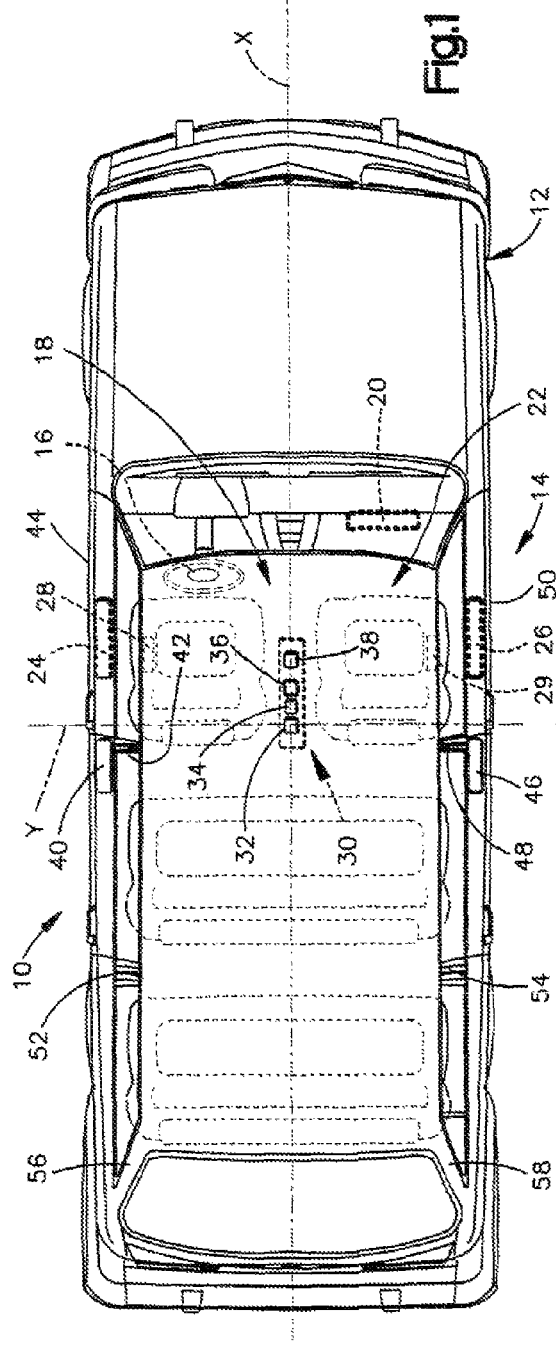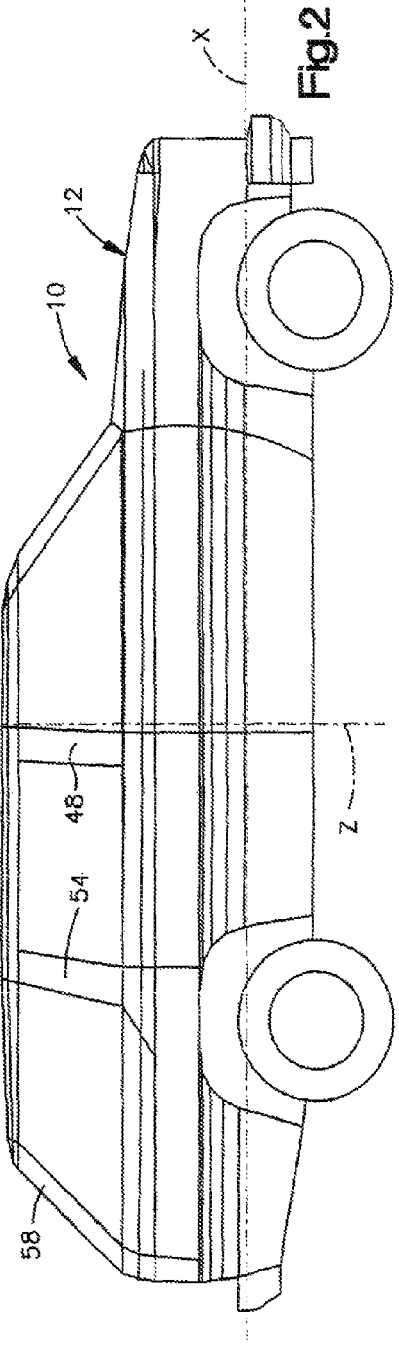

METHOD AND APPARATUS FOR DETERMINING A VEHICLE PITCH-OVER CONDITION

RELATED APPLICATION

This application claims priority from U.S. Provisional Application No. 61/073,518, filed Jun. 18, 2008.

FIELD OF THE INVENTION

The present invention relates to a method and apparatus for determining a vehicle pitch-over condition and, in particular, a method and apparatus for controlling a vehicle actuatable occupant restraint device in response to determining the occurrence of a vehicle pitch-over condition.

BACKGROUND OF THE INVENTION

Actuatable occupant restraint systems are used to help protect occupants of a vehicle in the event of a vehicle crash event. Such an actuatable occupant restraint systems may include an inflatable occupant restraint device, such as an air bag, to help protect a vehicle occupant upon the determined occurrence of a vehicle collision or a vehicle rollover event. U.S. Pat. No. 5,935,182 to Foo et al., assigned to TRW Inc., discloses a method and apparatus for determining such crash events and is particularly directed to discriminating a vehicle crash condition using virtual crash sensing. U.S. Pat. No. 6,600,414 to Foo et al., also assigned to TRW Inc., discloses a method and apparatus for determining a vehicle rollover event that includes a discriminating safing function. U.S. Pat. Nos. 5,890,084 and 6,600,985 and U.S. Patent Application Publication 2006/0235575 all disclose the detection of vehicle rollover events, including detection of roll rate and/or angular rate about a vehicle's Y-axis.

SUMMARY OF THE INVENTION

The present invention is directed to a method and apparatus for determining a vehicle pitch-over condition and to a method and apparatus for controlling an actuatable occupant restraint device in response to a vehicle pitch-over condition.

In accordance with an example embodiment of the present invention, an apparatus for determining a pitch-over condition of a vehicle comprises a first accelerometer for sensing acceleration in a Z-axis direction substantially perpendicular to both a front-to-rear axis of the vehicle and a side-to-side axis of the vehicle and for providing a first acceleration signal indicative thereof. A second accelerometer for senses acceleration in an X-axis direction substantially parallel to said front-to-rear axis of the vehicle and provides a second acceleration signal indicative thereof. A controller determines a Z-axis velocity value from the first acceleration signal and a pitch-over condition of the vehicle in response to both the determined Z-axis velocity value and the second acceleration signal.

In accordance with another example embodiment of the present invention, an apparatus for controlling actuation of an actuatable occupant restraint device of a vehicle comprises an actuatable occupant restraint device and a first accelerometer for sensing acceleration in a Z-axis direction substantially perpendicular to both a front-to-rear axis of the vehicle and a side-to-side axis of the vehicle and for providing a first acceleration signal indicative thereof. A second accelerometer senses acceleration in an X-axis direction substantially parallel to said front-to-rear axis of the vehicle and provides a second acceleration signal indicative thereof. A controller determines a Z-axis velocity value from the first acceleration signal, and actuates an actuatable occupant restraint device of the vehicle in response to both the determined Z-axis velocity value and the second acceleration signal.

In accordance with a further example embodiment of the present invention, an apparatus for controlling actuation of an actuatable occupant restraint device of a vehicle comprises a first accelerometer for sensing acceleration in a Z-axis direction substantially perpendicular to both a front-to-rear axis of the vehicle and a side-to-side axis of the vehicle and for providing a first acceleration signal indicative thereof. A second accelerometer senses acceleration in an X-axis direction substantially parallel to said front-to-rear axis of the vehicle and provides a second acceleration signal indicative thereof. A controller determines Z-axis velocity and Z-axis displacement from the first acceleration signal and X-axis acceleration from the second acceleration signal. The controller provides an actuation signal for actuating the actuatable occupant restraint device of the vehicle in response to both the determined Z-axis velocity as a function of the determined Z-axis displacement and the determined X-axis acceleration as a function of the determined Z-axis displacement.

In accordance with yet another example embodiment of the present invention, a method is provided for determining a pitch-over condition of a vehicle. The method comprises the step of sensing acceleration in a Z-axis direction substantially perpendicular to both a front-to-rear axis of the vehicle and a side-to-side axis of the vehicle and providing a first acceleration signal indicative thereof. The method also comprises the step of sensing acceleration in an X-axis direction substantially parallel to said front-to-rear axis of the vehicle and for providing a second acceleration signal indicative thereof. The method further comprises the steps of determining a Z-axis velocity value from the first acceleration signal and determining a pitch-over condition of the vehicle in response to both the determined Z-axis velocity value and the second acceleration signal.

BRIEF DESCRIPTION OF THE DRAWINGS

The foregoing and other features and advantages of the present invention will become apparent to one skilled in the art upon consideration of the following description of the invention and the accompanying drawings, in which:

FIG. 1 is a schematic plan top view of a vehicle having an actuatable occupant restraint system in accordance with an example embodiment of the present invention;

FIG. 2 is a schematic side elevation view of the vehicle of FIG. 1;

DETAILED DESCRIPTION

Figure 3:
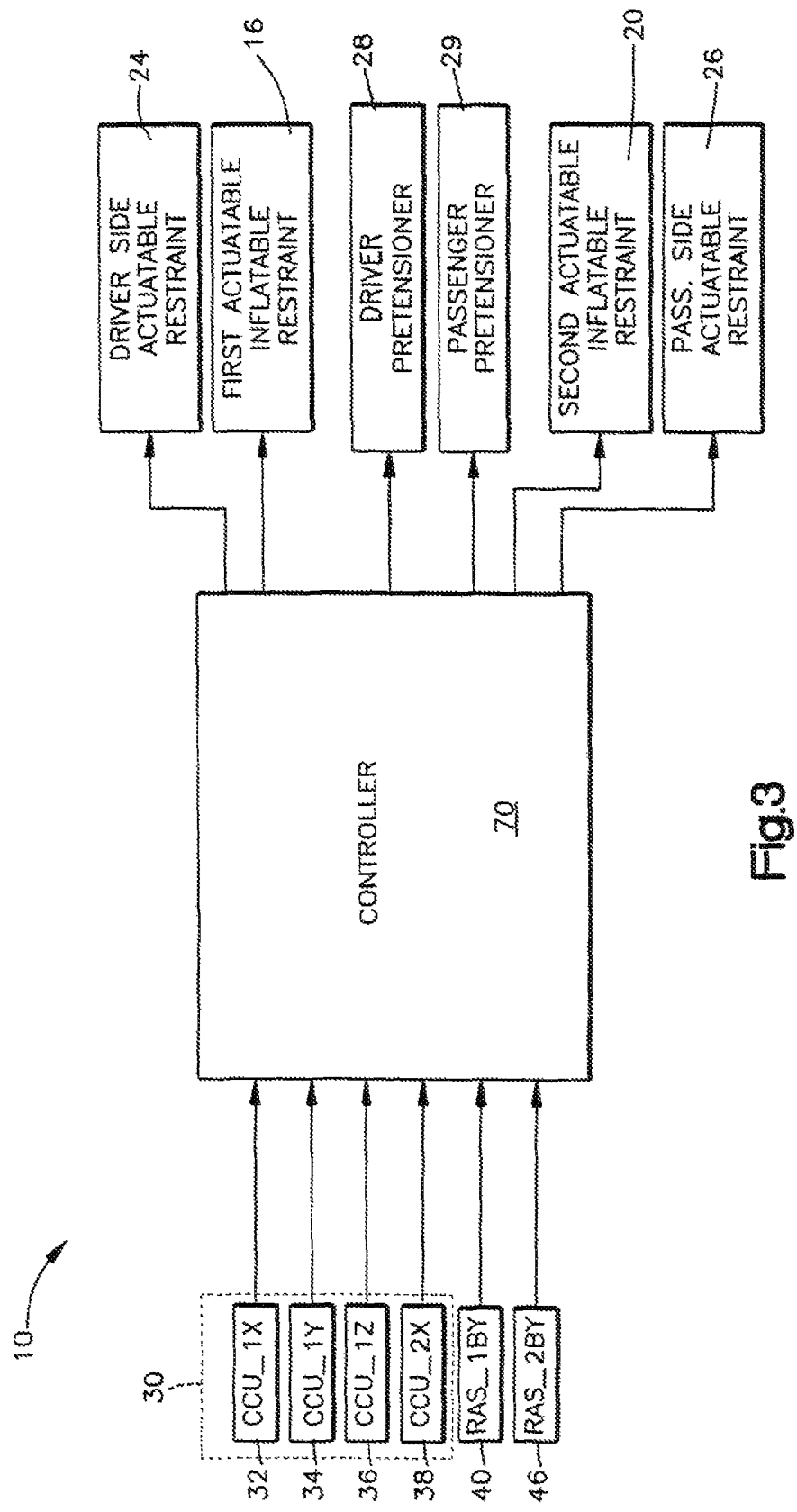
FIG. 3 is a functional block diagram of the control portion of the apparatus of FIG. 1.

Referring to FIGS. 1 through 3, an apparatus 10 is mounted in a vehicle 12 for determining a pitch-over condition of the vehicle and controlling actuation of an actuatable occupant restraint system 14, in accordance with an example of the present invention. The actuatable occupant restraint system 14 comprises, for example, a first frontal inflatable occupant restraint device 16, such as a steering wheel-mounted air bag module, located on a driver side 18 of the vehicle 12. The actuatable occupant restraint system 14 may also comprise a second frontal inflatable occupant restraint device 20, such as an instrument panel-mounted air bag module, located on a passenger side 22 of the vehicle 12.

The actuatable occupant restraint system 14 may further comprise a first side impact inflatable occupant restraint device 24, such as a door-mounted air bag module, a seat-mounted air bag module, or a roof rail-mounted curtain air bag module, located on the driver side 18 of the vehicle 12. The first side impact inflatable occupant restraint device 24 may be located in or adjacent to side structure of the vehicle 12 such as the vehicle doors, pillars, and/or side body panels. The actuatable occupant restraint system 14 may still further comprise a second side impact inflatable occupant restraint device 26, such as a door-mounted air bag module, a seat-mounted air bag module, or a roof rail-mounted curtain air bag module, located in or adjacent to side structure on the passenger side 22 of the vehicle 12. The actuatable occupant restraint system 14 may yet further or alternatively comprise an actuatable seat belt occupant restraint device, such as a driver side seat belt pretensioner 28 and/or a passenger side seat belt pretensioner 29. The actuatable occupant restraint system 14 may additionally or alternatively comprise any actuatable occupant restraint device that helps to protect a vehicle occupant in response to an impact to or a rollover event or pitch-over condition of the vehicle 12.

The occupant restraint devices 16, 20, 24, 26, 28 and 29 of the actuatable occupant restraint system 14 are actuatable safety or restraint devices of the vehicle 12. Other actuatable safety or restraint devices of the vehicle 12 that may be actuated in response to an impact to or a rollover event or pitch-over condition of the vehicle include vehicle door locks (not shown) and may include a suspension control system, a deployable roll bar and an external air bag or other inflatable devices internal or external to the vehicle.

The apparatus 10 further comprises a crash or collision sensor assembly 30 located at a substantially central location in the vehicle 12. The sensor assembly 30 includes a first crash acceleration sensor 32, such as an accelerometer, having its axis of sensitivity oriented to sense crash acceleration in a direction substantially parallel to a longitudinal or front-to-rear axis of the vehicle 12. The longitudinal or front-to-rear axis of the vehicle 12 is designated the X-axis in FIGS. 1 and 2. The first crash acceleration sensor 32 provides a crash acceleration signal designated CCU_1X. The sensor assembly 30 also comprises a second crash acceleration sensor 34, such as an accelerometer, having its axis of sensitivity oriented to sense crash acceleration in a direction substantially parallel to a transverse or side-to-side axis of the vehicle 12. The transverse or side-to-side axis of the vehicle 12 is designated the Y-axis in FIGS. 1 and 2 and is oriented substantially perpendicular to the X-axis. The second crash acceleration sensor 34 provides a crash acceleration signal designated CCU_1Y.

The sensor assembly 30 further comprises a third crash acceleration sensor 36, such as an accelerometer, having its axis of sensitivity oriented to sense crash acceleration in a direction substantially parallel to a vertical axis of the vehicle 12. The vertical axis of the vehicle 12 is designated the Z-axis, as seen in FIGS. 1 and 2, and is oriented substantially perpendicular to the both X-axis and the Y-axis. The third crash acceleration sensor 36 provides a crash acceleration signal designated CCU_1Z. The sensor assembly 30 may still further comprise a fourth crash acceleration sensor 38, such as an accelerometer, having its axis of sensitivity oriented to sense crash acceleration in a direction substantially parallel to the X-axis. The fourth crash acceleration sensor 38 provides a crash acceleration signal designated CCU_2X.

The first crash acceleration sensor 32 preferably has a nominal sensitivity of ±100g's (g being the value of acceleration due to earth's gravity, i.e., 32 feet per second squared or 9.8 meters per second squared). The second, third, and fourth crash acceleration sensors 34, 36 and 38, respectively, in accordance with one example embodiment of the present invention, have nominal sensitivities of ±20g's, ±8g's, and ±50g's, respectively.

The crash acceleration signals CCU_1X, CCU_1Y, CCU_1Z, and CCU_2X from the crash acceleration sensors 32, 34, 36, and 38, respectively, can take any of several forms. Each of the crash acceleration signals CCU_1X, CCU_1Y, CCU_1Z, and CCU_2X can have amplitude, frequency, pulse duration, and/or any other electrical characteristic(s) that vary as a function of the sensed crash acceleration. In the example embodiment shown in FIGS. 1 through 3, the crash acceleration signals CCU_1X, CCU_1Y, CCU_1Z, and CCU_2X have frequency and amplitude characteristics indicative of the sensed crash acceleration, i.e., that vary as a function of the sensed crash acceleration. Thus, each of the crash acceleration signals CCU_1X, CCU_1Y, CCU_1Z, and CCU_2X has an electrical characteristic functionally related to the sensed crash acceleration along the axis of sensitivity of the corresponding crash acceleration sensor 32, 34, 36 or 38, respectively.

The apparatus 10 may also include a driver side satellite crash acceleration sensor 40 located in or adjacent to a side structure on the driver side 18 of the vehicle 12, such as in the driver side vehicle B-pillar 42 or in the driver side door 44. The side satellite crash acceleration sensor 40 has an axis of sensitivity oriented to sense crash acceleration in a direction substantially parallel to the vehicle's Y-axis and provides a signal designated RAS_1BY.

The apparatus 10 may further include a passenger side satellite crash acceleration sensor 46 located in or adjacent to a side structure on the passenger side 22 of the vehicle 12, such as in the passenger side B-pillar 48 or in the passenger side door 50. The side satellite crash acceleration sensor 46 has an axis of sensitivity oriented to sense crash acceleration in a direction substantially parallel to the vehicle's Y-axis and provides a signal designated as RAS_2BY.

The crash acceleration signals RAS_1BY and RAS_2BY from the side satellite crash acceleration sensors 40 and 46, respectively, can take any of several forms. Each of the crash acceleration signals RAS_1BY and RAS_2BY can have amplitude, frequency, pulse duration, and/or any other electrical characteristic that varies as a function of the sensed crash acceleration. In the embodiment of FIGS. 1 through 3, the crash acceleration signals RAS_1BY and RAS_2BY have frequency and amplitude characteristics that vary as a function of the sensed crash acceleration in a direction substantially parallel to the vehicle's Y-axis. Thus, each of the crash acceleration signals RAS_1BY and RAS_2BY have an electrical characteristic that varies as a function of the sensed crash acceleration along the axis of sensitivity of the corresponding side satellite crash acceleration sensor 40 or 46, respectively. Satellite crash acceleration sensor 40 or 46 are arranged to sense acceleration and provide positive crash acceleration values in opposite directions.

Other Y-axis side satellite crash acceleration sensors may be included in the apparatus 10. Such Y-axis side satellite crash acceleration sensors may be mounted in or adjacent to C-pillars 52 and 54 on the driver side 18 and passenger side 22, respectively, of the vehicle 12 and/or in or adjacent to D-pillars 56 and 58 on the driver side 18 and passenger side 22, respectively, of the vehicle. If C-pillar and/or D-pillar side satellite crash acceleration sensors are used, they provide signals designated as RAS_C3Y (driver side C-pillar 52), RAS_C4Y (passenger side C-pillar 54), RAS_D5Y (driver side D-pillar 56), and RAS_D6Y (passenger side D-pillar 58). In the embodiment of the invention shown in FIGS. 1 through 3, however, only side satellite crash acceleration sensors 40 and 46 are present.

Referring to FIG. 3, the apparatus 10 further includes a controller 70. The crash acceleration signals CCU_1X and CCU_1Z from the crash acceleration sensors 32 and 36, respectively, are provided to the controller 70. In accordance with one example embodiment of the present invention, the controller 70 may be a microcomputer programmed to execute a control process, including one or more algorithms. The functions performed by the controller 70 could, however, be carried out by other digital and/or analog circuitry, including separate electrical or electronic components, which could be assembled on one or more circuit boards using discrete circuitry or fabricated as an application specific integrated circuit ("ASIC").

In accordance with an example embodiment of the present invention, the controller 70 monitors the crash acceleration signals CCU_1X and CCU_1Z from the crash acceleration sensors 32 and 36, respectively. The controller 70 executes one or more algorithms to determine whether a vehicle pitch-over condition exists. A vehicle pitch-over condition is a vehicle event in which the vehicle 12 is rotating, either clockwise or counterclockwise, about an axis substantially parallel to the Y-axis to such a degree that the vehicle is likely to flip over about an end or corner of the vehicle. If the controller 70 determines that a vehicle pitch-over event is occurring for which actuation or deployment of the actuatable occupant restraint system 14 or individual occupant restraint devices or other actuatable safety or restraint devices of the vehicle is desired, the restraints will be actuated. The controller 70 has the ability to discriminate between a deployment pitch-over event and a non-deployment pitch-over event. The algorithms determine certain values from the crash acceleration signals CCU_1X and CCU_1Z. The determined values are used in determining whether a vehicle pitch-over condition exists and whether the actuatable occupant restraint system 14 or individual occupant restraint devices or any other actuatable safety device of the vehicle should be deployed or actuated. If a determination is made in accordance with the determined values to deploy or actuate the actuatable occupant restraint system 14 or individual occupant restraint devices, such as the first frontal inflatable occupant restraint device 16 or the second frontal inflatable restraint device 20, or any other actuatable safety device of the vehicle, the controller 70 outputs an appropriate deployment signal or command. Multi-stage devices may be actuated at different times depending on the determined values or different devices may be actuated at different times depending on the determined values.

The apparatus 10 preferably uses only the crash acceleration signals CCU_1X and CCU_1Z in determining whether a vehicle pitch-over condition exists and whether the actuatable occupant restraint system 14 or individual actuatable safety or restraint devices of the vehicle should be deployed or actuated. The apparatus 10 may alternatively also employ the crash acceleration signals CCU_1Y and CCU_2X, with or without filtering, in pitch-over determination and/or deployment or actuation decisions. Other signals that may be received and employed in pitch-over determination and/or deployment or actuation decisions, in addition to the crash acceleration signals CCU_1X and CCU_1Z, are signals RAS_1BY and RAS_2BY from side satellite crash acceleration sensors 40 and 46 and signals RAS_C3Y, RAS_C4Y, RAS_D5Y, and RAS_D6Y from optional C-pillar and/or D-pillar side satellite crash acceleration sensors. Still other signals that may be received and employed in pitch-over determination and/or deployment or actuation decisions may include signals from a driver and/or passenger seat belt buckle switch sensor that provides a signal indicating whether the buckle is latched or unlatched, a driver and/or passenger weight sensor that provides a signal indicative of the seat occupant's sensed weight, and sensors that provide signals indicative of other vehicle occupant information, such as presence, position, height, girth, movement and/or use of a child seat.

Figure 4:
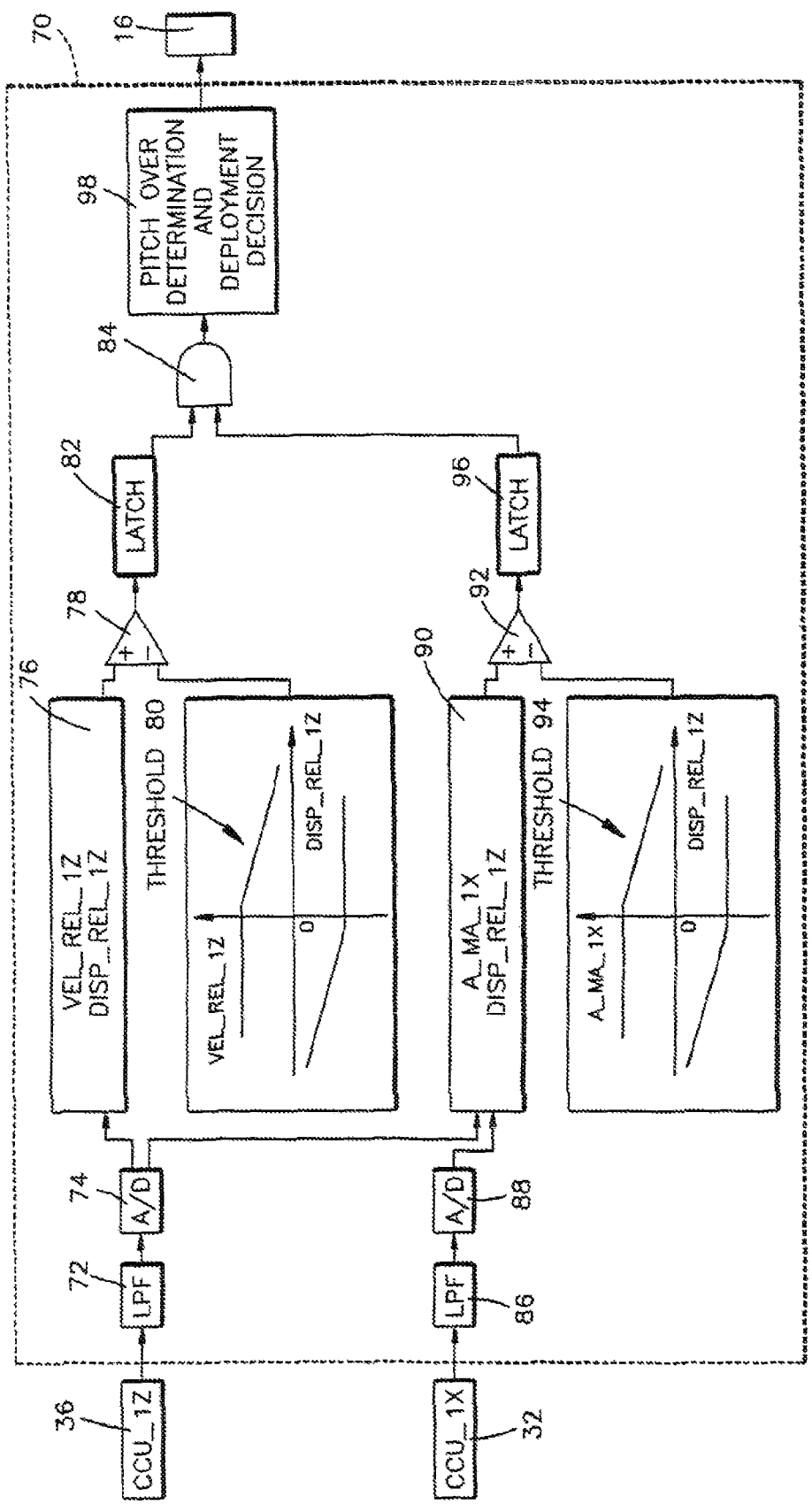
FIG. 4 is a functional block diagram showing a control process used by the control portion of FIG. 3 in accordance with one example embodiment of the present invention.

Referring to FIG. 4, the controller 70 determines whether a vehicle pitch-over condition exists and controls the actuatable occupant restraint system 14 in accordance with a control process and logic shown in accordance with one example embodiment of the present invention. The process and logic shown and described is specifically directed to controlling an actuatable occupant restraint device on the driver side 18 of the vehicle 12, such as the first frontal inflatable occupant restraint device 16. Notwithstanding, those skilled in the art will appreciate that this process is representative of the process and logic that may be used to control any actuatable restraint of the vehicle 12 such as the second frontal inflatable occupant restraint device 20 on the passenger side 22 of the vehicle 12 or any other actuatable occupant restraint device that helps to protect a vehicle occupant in response to a pitch-over condition of the vehicle 12. The control process and logic may also be used to control any actuatable safety device of the vehicle 12, such as vehicle door locks, a suspension control system, a deployable roll bar and/or an external air bag or other inflatable device external or internal to the vehicle.

In accordance with the example embodiment control process, the crash acceleration sensor 36 provides an acceleration signal CCU_1Z having a characteristic (e.g., frequency and amplitude) indicative of the vehicle's acceleration in a direction substantially parallel to the Z-axis of the vehicle 12. The acceleration signal CCU_1Z is provided to a low-pass-filter ("LPF") function 72 of the controller 70. The LPF function 72 filters the acceleration signal CCU_1Z to eliminate extraneous signal components, such as, frequencies resulting from extraneous vehicle operating events and/or from road noise. The signal components removed through filtering are not useful in discriminating whether a vehicle pitch-over event is occurring and whether a vehicle pitch-over event is occurring for which deployment of a driver's side actuatable occupant restraint device, such as the first frontal inflatable occupant restraint device 16, is desired. Empirical testing may be used to determine the signal components useful for discrimination of a vehicle pitch-over condition in a vehicle of interest and/or determining whether a vehicle pitch-over event is occurring for which deployment of a driver side actuatable occupant restraint device is desired. Signal components indicative of a vehicle pitch-over condition and/or useful in determining whether a vehicle pitch-over event is occurring for which deployment of a driver side actuatable occupant restraint device is desired are passed for further processing.

The filtered output signal from the LPF function 72 is provided to an analog-to-digital ("A/D") converter function 74 of the controller 70. The A/D converter function 74 converts the filtered crash acceleration signal into a digital signal. The output of the A/D converter function 74 may be filtered with another filter function (not shown) having filter values determined for the purpose of eliminating small drifts and offsets associated with the A/D conversion. This other filter function may be digitally implemented within the controller 70. A determination function 76 of the controller 70 determines two crash metric values, VEL_REL_1Z and DIPL_REL_1Z, from the filtered crash acceleration signal CCU_1Z. Specifically, the determination function 76 determines VEL_REL_1Z, which is velocity in a direction substantially parallel to the Z-axis, by integrating the filtered crash acceleration signal CCU_1Z. The determination function 76 also determines DISP_REL_1Z, which is displacement in a direction substantially parallel to the Z-axis, by double integrating the filtered crash acceleration signal CCU_1Z.

A comparison function 78 of the controller 70 compares the value VEL_REL_1Z against a threshold. The threshold may be variable or may be fixed. Specifically, the comparison function 78 compares the VEL_REL_1Z value as a function of the DISP_REL_1Z value against a first varying threshold 80. A graphical representation of the variation of the first threshold 80 is included in FIG. 4. As can be seen, with increasing displacement in a direction substantially parallel to the Z-axis, whether positive or negative (i.e., up or down along the Z-axis as viewed in FIG. 2), the first threshold 80 substantially decreases as a function of such displacement DISP_REL_1Z, provided that velocity VEL_REL_1Z is in the same direction as displacement. If, however, displacement DISP_REL_1Z increases in a direction substantially parallel to the Z-axis, but velocity VEL_REL_1Z is in an opposite direction substantially parallel to the Z-axis, the first threshold 80 remains constant. Empirical testing may be used to determine the variation in the first threshold 80 as a function of the displacement value DISP_REL_1Z. The occurrence of the VEL_REL_1Z value exceeding the first threshold 80, as determined by comparison function 78, is latched by a latch function 82 of controller 70, which provides a digital HIGH signal to an AND function 84 of the controller 70.

The crash acceleration sensor 32 provides an acceleration signal CCU_1X having a characteristic (e.g., frequency and amplitude) indicative of the vehicle's crash acceleration in a direction substantially parallel to the X-axis of the vehicle 12 upon the occurrence of a crash event. The acceleration signal CCU_1X is provided to a low-pass-filter ("LPF") function 86 of the controller 70. The LPF function 86 filters the acceleration signal CCU_1X to eliminate extraneous signal components, such as, frequencies resulting from extraneous vehicle operating events and/or from road noise. The signal components removed through filtering are not useful in discriminating whether a vehicle pitch-over condition exists and whether a vehicle pitch-over event is occurring for which deployment of a driver side actuatable occupant restraint device, such as the first frontal inflatable occupant restraint device 16, is desired. Empirical testing may be used to determine the signal components useful for discrimination of a vehicle pitch-over condition in a vehicle of interest and/or determining whether a vehicle pitch-over event is occurring for which deployment of a driver side actuatable occupant restraint device is desired. Signal components indicative of a vehicle pitch-over condition and/or useful in determining whether a vehicle pitch-over event is occurring for which deployment of a driver side actuatable occupant restraint device is desired are passed for further processing.

The filtered output signal from the LPF function 86 is provided to an analog-to-digital ("A/D") converter function 88 of the controller 70. The A/D converter function 88 converts the filtered crash acceleration signal CCU_1X into a digital signal. The output of the A/D converter function 88 may be filtered with another filter function (not shown) having filter values that may be empirically determined for the purpose of eliminating small drifts and offsets associated with the A/D conversion. This other filter function may be digitally implemented within the controller 70. A determination function 90 of the controller 70 determines a crash metric value A_MA_1X from the filtered crash acceleration signal CCU_1X and determines the crash metric value DISP_REL_1Z by double integrating the filtered crash acceleration signal CCU_1Z. As an alternative, the crash metric value DISP_REL_1Z can be provided to the determination function 90 by the determination function 76.

The value A_MA_1X is a moving average of acceleration as sensed by the first crash acceleration sensor 32. This value is determined by calculating moving average values of the associated filtered acceleration signal CCU_1X from the first crash acceleration sensor 32. A moving average is the sum of the last predetermined number of samples of the filtered acceleration signal divided by the number of samples. The average is updated by removing the oldest sample, replacing it with the latest sample, and then determining the new average. As the average value changes or "moves" over time, it is referred to as a "moving average". Empirical testing may be used to determine the number of samples to be used for the value A_MA_1X.

A comparison function 92 of the controller 70 compares the value A_MA_1X against a threshold. The threshold may be variable or may be fixed. Specifically, the comparison function 92 compares the A_MA_1X value as a function of the DISP_REL_1Z value against a second varying threshold 94. A graphical representation of the variation of the second threshold 94 is included in FIG. 4. As can be seen, with increasing displacement in a direction substantially parallel to the Z-axis, whether positive or negative (i.e., up or down along the Z-axis as viewed in FIG. 2), the second threshold 94 substantially decreases as a function of such displacement DISP_REL_1Z, provided that the "sign" of the moving average of acceleration A_MA_1X is the same as the "sign" of displacement DISP_REL_1Z. In other words, the foregoing relationship exists (a) when the moving average of acceleration A_MA_1X is positive (i.e., acceleration is in a forward direction) and displacement DISP_REL_1Z is positive (i.e., displacement is upward as viewed in FIG. 2) and (b) when the moving average of acceleration A_MA_1X is negative (i.e., acceleration is in a rearward direction) and displacement DISP_REL_1Z is negative (i.e., displacement is downward as viewed in FIG. 2). If, however, the "sign" of the moving average of acceleration A_MA_1X is opposite the "sign" of displacement DISP_REL_1Z, the second threshold 94 remains constant.

Empirical testing may be used to determine the variation in the second threshold 94 as a function of the displacement value DISP_REL_1Z. The occurrence of the A_MA_1X value exceeding the second threshold 94, as determined by comparison function 92, is latched by a latch function 96 of controller 70, which provides a digital HIGH signal to the AND function 84 of the controller.

When the AND function 84 receives digital HIGH signals from both the latch function 82 and the latch function 96, the AND function 84 is ON or HIGH. In response to the AND function 84 being ON or HIGH, a pitch-over condition determination and deployment control function 98 determines that a pitch-over condition of the vehicle 12 is occurring. The pitch-over condition determination and deployment control function 98 of the controller 70 also determines whether a vehicle pitch-over event is occurring for which deployment or actuation of an actuatable occupant restraint device, such as the first frontal inflatable occupant restraint device 16, or any other vehicle safety device is desired. If deployment is desired, the controller 70 outputs a deployment signal to the actuatable occupant restraint device, such as the first frontal inflatable occupant restraint device 16, which deploys in response to the deployment signal. The deployment or actuation decision may be based solely on the determination that a vehicle pitch-over condition is occurring or other inputs may be considered in making the deployment or actuation decision.

From the above description of the invention, those skilled in the art will perceive improvements, changes and modifications. Such improvements, changes, and/or modifications within the skill of the art are intended to be covered by the appended claims.

Having described the invention, the following is claimed:

1. An apparatus for determining a pitch-over condition of a vehicle, said apparatus comprising:
    a first accelerometer for sensing acceleration in a Z-axis direction substantially perpendicular to both a front-to-rear axis of the vehicle and a side-to-side axis of the vehicle and for providing a first acceleration signal indicative thereof;
    a second accelerometer for sensing acceleration in an X-axis direction substantially parallel to said front-to-rear axis of the vehicle and for providing a second acceleration signal indicative thereof; and
    a controller for determining a Z-axis velocity value from the first acceleration signal and determining a pitch-over condition of the vehicle in response to both the determined Z-axis velocity value and the second acceleration signal, wherein said controller determines an X-axis acceleration value from said second acceleration signal as a function of displacement in said Z-axis direction.

2. The apparatus of claim 1 wherein said controller also provides an actuation signal for actuating an actuatable safety device of the vehicle in response to determining a pitch-over condition of the vehicle.

3. The apparatus of claim 1 wherein said controller determines said Z-axis velocity value as a function of displacement in said Z-axis direction.

4. The apparatus of claim 1 wherein said controller determines said Z-axis velocity value as a function of displacement in said Z-axis direction.

5. The apparatus of claim 4 wherein said controller determines said X-axis acceleration value as a first moving average of acceleration in said X-axis direction as a function of displacement in said Z-axis direction.

6. The apparatus of claim 4 wherein said controller provides an actuation signal for actuating an actuatable safety device of the vehicle when both said Z-axis velocity value exceeds a first threshold and said X-axis acceleration value exceeds a second threshold.

7. The apparatus of claim 6 wherein at least one of said first and second thresholds is a variable threshold.

8. The apparatus of claim 6 wherein at least one of said first and second thresholds is a fixed threshold.

9. The apparatus of claim 1 wherein at least one of said first and second accelerometers is located at a substantially central vehicle location.

10. An apparatus for controlling actuation of an actuatable occupant restraint device of a vehicle, said apparatus comprising:
    an actuatable occupant restraint device;
    a first accelerometer for sensing acceleration in a Z-axis direction substantially perpendicular to both a front-to-rear axis of the vehicle and a side-to-side axis of the vehicle and for providing a first acceleration signal indicative thereof;
    a second accelerometer for sensing acceleration in an X-axis direction substantially parallel to said front-to-rear axis of the vehicle and for providing a second acceleration signal indicative thereof; and
    a controller for determining a Z-axis velocity value from the first acceleration signal and providing an actuation signal for actuating the actuatable occupant restraint device of the vehicle in response to both the determined Z-axis velocity value and the second acceleration signal, wherein said controller determines an X-axis acceleration value from said second acceleration signal as a function of displacement in said Z-axis direction.

11. The apparatus of claim 10 wherein said controller determines said Z-axis velocity value as velocity in said Z-axis direction as a function of displacement in said Z-axis direction.

12. The apparatus of claim 10 wherein said controller determines said Z-axis velocity value as a function of displacement in said Z-axis direction.

13. The apparatus of claim 12 wherein said controller determines said X-axis acceleration value as a first moving average of acceleration in said X-axis direction as a function of displacement in said Z-axis direction.

14. The apparatus of claim 12 wherein said controller provides an actuation signal for actuating the actuatable occupant restraint device when both said Z-axis velocity value exceeds a first threshold and said X-axis acceleration value exceeds a second threshold.

15. The apparatus of claim 14 wherein at least one of said first and second thresholds is a variable threshold.

16. The apparatus of claim 14 wherein at least one of said first and second thresholds is a fixed threshold.

17. The apparatus of claim 10 wherein at least one of said first and second accelerometers is located at a substantially central vehicle location.

18. An apparatus for controlling actuation of an actuatable occupant restraint device of a vehicle, said apparatus comprising:
    a first accelerometer for sensing acceleration in a Z-axis direction substantially perpendicular to both a front-to-rear axis of the vehicle and a side-to-side axis of the vehicle and for providing a first acceleration signal indicative thereof;
    a second accelerometer for sensing acceleration in an X-axis direction substantially parallel to said front-to-rear axis of the vehicle and for providing a second acceleration signal indicative thereof; and
    a controller for determining Z-axis velocity and Z-axis displacement from the first acceleration signal, determining X-axis acceleration from the second acceleration signal, and providing an actuation signal for actuating the actuatable occupant restraint device of the vehicle in response to both the determined Z-axis velocity as a function of the determined Z-axis displacement and the determined X-axis acceleration as a function of the determined Z-axis displacement.

19. A method for determining a pitch-over condition of a vehicle, the method comprising the steps of:
    sensing acceleration using an accelerometer in a Z-axis direction substantially perpendicular to both a front-to-rear axis of the vehicle and a side-to-side axis of the vehicle and providing a first acceleration signal indicative thereof;
    sensing acceleration using an accelerometer in an X-axis direction substantially parallel to said front-to-rear axis of the vehicle and providing a second acceleration signal indicative thereof;

determining a Z-axis velocity value from the first acceleration signal;

determining an X-axis acceleration value from said second acceleration signal, said step of determining an X-axis acceleration value comprising determining acceleration in said X-axis direction as a function of displacement in said Z-axis direction; and determining a pitch-over condition of the vehicle in response to both the determined Z-axis velocity value and the second acceleration signal.

20. The method of claim 19 further comprising the step of providing an actuation signal for actuating an actuatable safety device of the vehicle in response to determining a pitch-over condition of the vehicle.

21. The method of claim 19 wherein said step of determining a Z-axis velocity value comprises determining velocity in said Z-axis direction as a function of displacement in said Z-axis direction.

22. The method of claim 19 wherein said step of determining a Z-axis velocity value comprises determining velocity in said Z-axis direction as a function of displacement in said Z-axis direction.

23. The method of claim 22 wherein said step of determining the X-axis acceleration value comprises determining a first moving average of acceleration in said X-axis direction as a function of displacement in said Z-axis direction.

24. The method of claim 22 further comprising the step of actuating an actuatable safety device of the vehicle when both said Z-axis velocity value exceeds a first threshold and said X-axis acceleration value exceeds a second threshold.

\* \* \* \* \*